United States Patent
Ito et al.

(10) Patent No.: US 8,326,560 B2
(45) Date of Patent: *Dec. 4, 2012

(54) PORTABLE ELECTRONIC APPARATUS AND GEOMAGNETISM SENSOR CALIBRATION METHOD

(75) Inventors: Kazuto Ito, Kanagawa (JP); Yasuhiro Ueno, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 707 days.

This patent is subject to a terminal disclaimer.

(21) Appl. No.: 12/295,607

(22) PCT Filed: Mar. 29, 2007

(86) PCT No.: PCT/JP2007/056834
§ 371 (c)(1),
(2), (4) Date: Sep. 28, 2009

(87) PCT Pub. No.: WO2007/114236
PCT Pub. Date: Oct. 11, 2007

(65) Prior Publication Data
US 2011/0320151 A1    Dec. 29, 2011

(30) Foreign Application Priority Data
Mar. 30, 2006    (JP) .................... 2006-096156

(51) Int. Cl.
G01C 17/38    (2006.01)
(52) U.S. Cl. ................................... 702/92
(58) Field of Classification Search ............ 702/92
See application file for complete search history.

(56) References Cited

U.S. PATENT DOCUMENTS

| | | |
|---|---|---|
| 6,401,047 B1 | 6/2002 | Voto et al. |
| 2003/0140510 A1 | 7/2003 | Woods et al. |
| 2005/0064814 A1 | 3/2005 | Matsuo et al. |
| 2007/0033818 A1 | 2/2007 | Kitamura et al. |
| 2008/0172174 A1 | 7/2008 | Okeya |

FOREIGN PATENT DOCUMENTS

| | | |
|---|---|---|
| EP | 1501038 A1 | 1/2005 |
| EP | 1643212 A1 | 4/2006 |
| JP | 2003-16398 | 1/2003 |
| JP | 2005-291931 | 10/2005 |
| JP | 2005-291932 | 10/2005 |
| JP | 2005-291933 | 10/2005 |

(Continued)

OTHER PUBLICATIONS

Extended European search report dated Feb. 21, 2012 issued in corresponding European application 07740272.5 cites the U.S. patent, U.S. patent application publications and foreign patent documents above.

(Continued)

Primary Examiner — Tung S Lau
(74) Attorney, Agent, or Firm — DLA Piper LLP (US)

(57) ABSTRACT

A portable electronic apparatus able to suppress a drop of display precision concerning a bearing due to a drop of a detection precision of geomagnetism accompanying non-contact communication by electromagnetic coupling etc. and a calibration method of a geomagnetism sensor are provided. When a non-contact communication function part (111) carries out non-contact communication, processing concerning the calibration of a geomagnetism sensor (110) and processing calculating the bearing after the end of that communication are performed so as to suppress the drop of the display precision concerning the bearing accompanying the non-contact communication.

9 Claims, 12 Drawing Sheets

FOREIGN PATENT DOCUMENTS

| | | |
|---|---|---|
| JP | 2005-291934 | 10/2005 |
| JP | 2005-291935 | 10/2005 |
| JP | 2005-291936 | 10/2005 |
| JP | 2005-345387 | 12/2005 |
| JP | 2005-345388 | 12/2005 |
| JP | 2006-005540 | 1/2006 |
| JP | 2006047038 A | 2/2006 |
| JP | 02006071348 A * | 3/2006 |
| WO | 2005003683 A1 | 1/2005 |
| WO | 2005095893 A1 | 10/2005 |

OTHER PUBLICATIONS

English translation of Korean office action dated Nov. 10, 2010 for corresponding Korean application 1020087026541.

* cited by examiner

FIG. 2
(A)
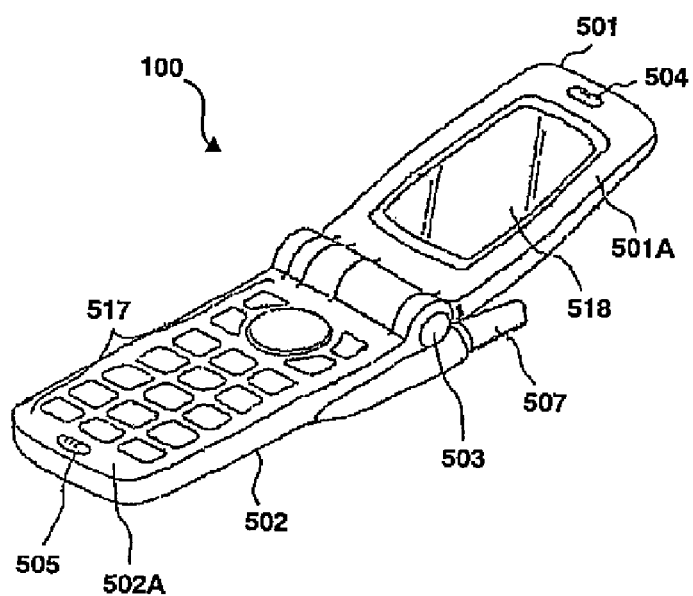
(B)
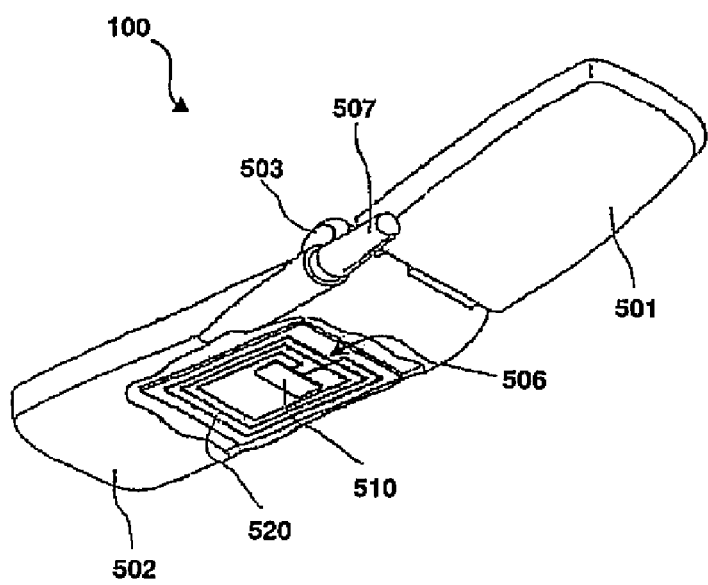

US 8,326,560 B2

PORTABLE ELECTRONIC APPARATUS AND GEOMAGNETISM SENSOR CALIBRATION METHOD

CROSS REFERENCE TO RELATED APPLICATION

This application is a national stage of International Application No. PCT/JP2007/056834 filed on Mar. 29, 2007, and claims the benefit of priority under 35 USC 119 of Japanese Patent Application No. 2006-096156 filed on Mar. 30, 2006, which is incorporated herein by reference.

TECHNICAL FIELD

The present invention relates to a portable electronic apparatus provided with a geomagnetism sensor and a geomagnetism sensor calibration method of the same.

BACKGROUND ART

Mobile phones provided with a navigation function utilizing GPS (Global Positioning System) to display a geographical position of the present location have been put into practical use. In this type of mobile phone, generally a geomagnetism sensor is mounted. It is possible to display a bearing together with the present location. For example, by the so-called "heading up" display method rotating a display direction of a map to match an advancing direction may be used to display the present position and the advancing direction in a manner easily understandable to a user.

A geomagnetism sensor uses, for example, a magnetoresistance device or other magnetism detection device to detect the intensity of geomagnetism in a plurality of directions (usually biaxial directions or triaxial directions). However, geomagnetism is very weak, therefore a detection value of a geomagnetism sensor is easily affected by other magnetism. In particular, magnetism generated in parts inside an electronic apparatus in which a geomagnetism sensor is mounted becomes a major cause of error of the detection value of the geomagnetism. The magnetism generated inside an electronic apparatus creates a constant magnetic field inside the electronic apparatus no matter which direction the electronic apparatus is directed in, therefore this causes a fixed error (offset) in the detection value of the geomagnetism. In order for the geomagnetism sensor to detect the geomagnetism with a good precision, calibration for estimating this offset and eliminating it from the detection value of the sensor becomes indispensable. Patent Documents 1 to 8 disclose technologies concerning calibration of a geomagnetism sensor mounted in a portable electronic apparatus.

On the other hand, IC chips engaging in non-contact communication with external reader/writer devices are becoming popular. IC cards in which these are embedded are being widely used for train and bus tickets, bank cash cards, electronic money media, and so on. In recent years, mobile phones having such IC card functions built-in have appeared and are attracting attention (see, for example, Patent Document 9).

Patent Document 1: Japanese Patent Publication (A) No. 2005-291931
Patent Document 2: Japanese Patent Publication (A) No. 2005-291932
Patent Document 3: Japanese Patent Publication (A) No. 2005-291933
Patent Document 4: Japanese Patent Publication (A) No. 2005-291934
Patent Document 5: Japanese Patent Publication (A) No. 2005-291935
Patent Document 6: Japanese Patent Publication (A) No. 2005-291936
Patent Document 7: Japanese Patent Publication (A) No. 2005-291937
Patent Document 8: Japanese Patent Publication (A) No. 2005-291938
Patent Document 9: Japanese Patent Publication (A) No. 2003-16398

DISCLOSURE OF THE INVENTION

Technical Problem

A portable electronic apparatus having a built-in IC card function is exposed to a strong magnetic field when engaging in non-contact communication etc. with a reader/writer device. Therefore, internal parts are magnetized or demagnetized and the internal magnetic field greatly changes in some cases. Accordingly, when a geomagnetism sensor is mounted in such a portable electronic apparatus, a magnetization state of the inside of the apparatus greatly changes before and after the non-contact communication, so there is a problem of a drop of detection precision of the geomagnetism.

Accordingly, it has been desired to provide a portable electronic apparatus able to suppress a drop in detection precision concerning a bearing caused by a drop of detection precision of geomagnetism accompanying non-contact communication by electromagnetic coupling and a method of calibration of such a geomagnetism sensor.

Technical Solution

According to the present invention, there is provided a portable electronic apparatus including: a display part configured to display information, a geomagnetism sensor detecting geomagnetism, a control part configured to calculate a bearing based on a detection value of the geomagnetism sensor and to display information concerning the bearing on the display part, and a non-contact communication part configured to engage in non-contact communication by electromagnetic coupling, wherein the control part can execute calibration-related processing concerning calibration of the geomagnetism sensor and, if non-contact communication is carried out in the non-contact communication part, executes the calibration-related processing after the end of the non-contact communication.

The control part may execute the calibration-related processing in a case where the non-contact communication is carried out while processing a program calculating the bearing and displaying the same on the display part.

The non-contact communication part may report a current state of non-contact communication or an end of non-contact communication to the control part. The control part may judge an end of non-contact communication based on a generation of a shift from a state where current non-contact communication is reported at the non-contact communication part to a state where it is not reported or based on a generation of reporting of the end of non-contact communication.

The control part may judge an end of non-contact communication based on a change of the detection value of the geomagnetism sensor.

In executing the calibration-related processing due to ending of the non-contact communication, the control part may execute the calibration-related processing after a predetermined time passes.

In executing the calibration-related processing due to ending of the non-contact communication, the control part may execute the calibration-related processing when calculating the bearing and displaying it on the display part and not execute the calibration-related processing when not displaying the bearing.

In executing the calibration-related processing due to ending of the non-contact communication, the control part may execute the calibration-related processing when starting a program calculating the bearing and displaying the same on the display part after the non-contact communication.

The portable electronic apparatus may include a memory part configured to store flag data. The control part may set the flag data at a first value when the non-contact communication is carried out and execute the calibration-related processing and reset the flag data at a second value if the flag data is set at a first value in the memory part when calculating the bearing and displaying the same on the display part.

The portable electronic apparatus may be composed to be able to cover a screen of the display part. In executing the calibration-related processing due to ending of the non-contact communication, the control part may execute the calibration-related processing when the screen of the display part is exposed.

The present invention relates to a calibration method of a geomagnetism sensor in a portable electronic apparatus having a geomagnetism sensor detecting geomagnetism, a control part configured to calculate a bearing based on a detection value of the geomagnetism sensor and to display information concerning the bearing on a display part, and a non-contact communication part configured to engage in non-contact communication by electromagnetic coupling. This geomagnetism sensor calibration method has a non-contact communication execution judgment step of judging whether or not non-contact communication was carried out in the communication part and a calibration step of executing or reporting calibration of the geomagnetism sensor and, when the non-contact communication execution judgment step judges that the non-contact communication was carried out, executes the calibration step after the end of the non-contact communication.

The non-contact communication execution judgment step may be executed before processing for calculation of the bearing based on the detection value of the geomagnetism sensor is started.

The portable electronic apparatus of the present invention may include a display part configured to display information, a GPS signal acquisition part configured to acquire GPS signals, a map acquisition part configured to acquire a map of a present location specified based on GPS signals via a wireless network, and a control part calculating a bearing and displaying the map acquired at the map acquisition part on the display part based on the bearing. The portable electronic apparatus may further include a non-contact communication part engaging in non-contact communication by electromagnetic coupling. In a state where the map acquired at the map acquisition part is displayed on the display part and non-contact communication is carried out in the non-contact communication part, the control part updates the map display after the end of the non-contact communication.

Advantageous Effects

According to the present invention, if non-contact communication by electromagnetic coupling is carried out, it is possible to perform processing concerned with updating of the display of the bearing after that communication and thereby suppress a drop in the detection precision of the bearing along with the non-contact communication.

BRIEF DESCRIPTION OF THE DRAWINGS

FIG. 2 Diagrams showing an example of an outer appearance of a mobile phone.

EXPLANATION OF REFERENCES

101 . . . wireless communication part, 102 . . . GPS signal reception part, 103 . . . key input part, 104 . . . audio processing part, 105 . . . speaker, 106 . . . microphone, 107 . . . display part, 108 . . . memory part, 109 . . . open/closed judgment part, 110 . . . geomagnetism sensor, 111 . . . non-contact communication function part, and 120 . . . control part.

BEST MODE FOR CARRYING OUT THE INVENTION

Below, an explanation will be given of a portable electronic apparatus of the present invention applied to a multi-function type mobile phone mounting a GPS navigation function and an IC card function therein.

Figure 1:
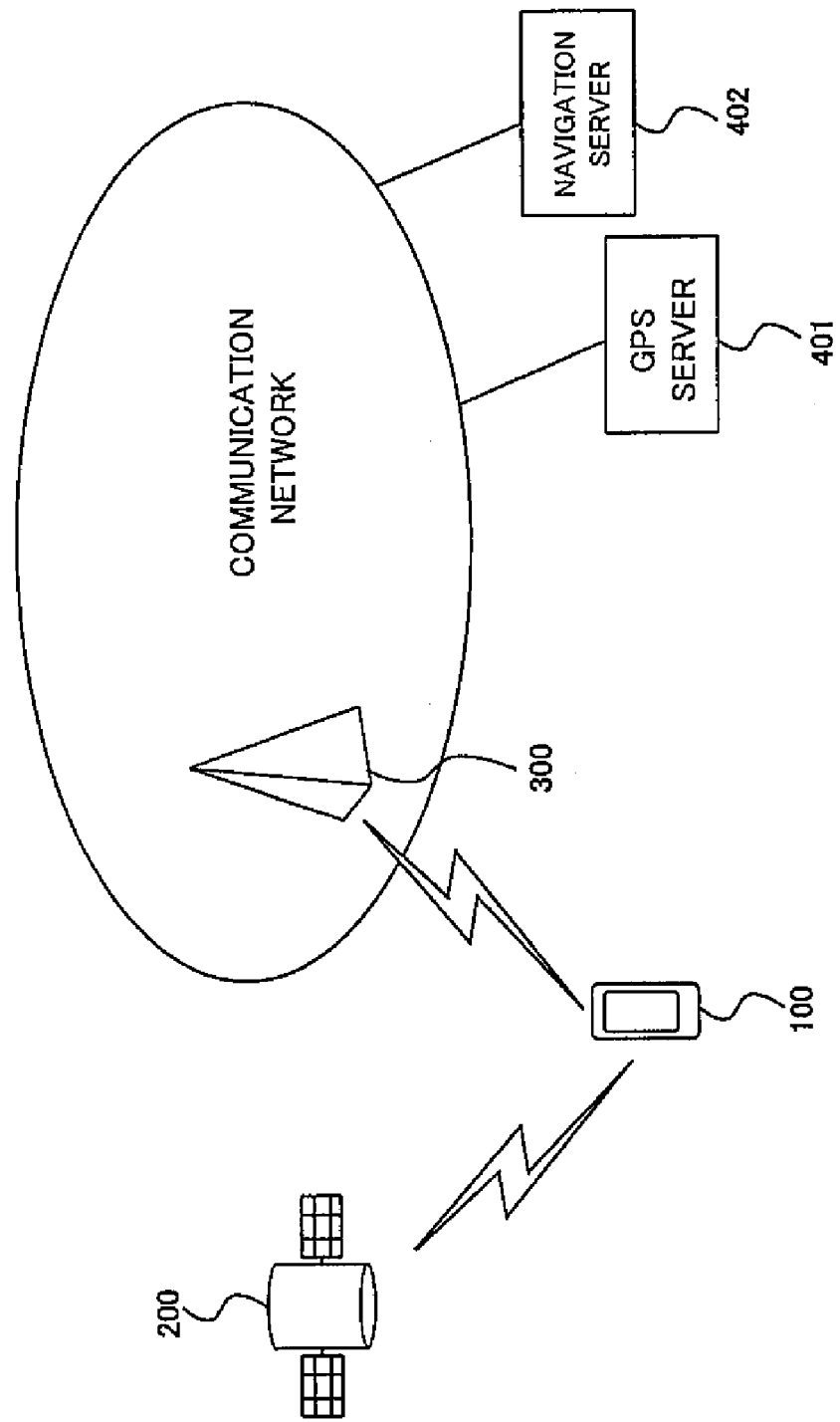
FIG. 1 A diagram showing an example of the configuration of a system for acquiring a geographical position and information of a map in a mobile phone (portable electronic apparatus) according to an embodiment of the present invention.

FIG. 1 is a diagram showing an example of the configuration of a system for acquiring a geographical position and information of a map in a mobile phone (portable electronic apparatus) 100 according to an embodiment of the present invention.

The mobile phone 100 receives GPS signals transmitted from three or more GPS satellites 200 in known orbits. Then, information concerning the received GS signals is transmitted from a base station 300 through a communication network to a GPS server 401. The position information of the present location is acquired from the GPS server 401. Further, the mobile phone 100 transmits position information of the present location acquired from the GPS server 401 from the base station 300 through the communication network to a navigation server 402 and acquires the information of a map of the periphery of the present location from the navigation server 402.

Based on the information of the GPS signal sent from the mobile phone 100 via the communication network, the GPS server 401 calculates the geographical position (for example, latitude and longitude) of the mobile phone 100. Then, it transmits the calculated position information through the communication network and the base station 300 to the mobile phone 100.

Based on the position information sent from the mobile phone 100 via the communication network, the navigation server 402 retrieves the information of the map of the periphery of the mobile phone 100 from the database. Then, it transmits the retrieved map information through the communication network and the base station 300 to the mobile phone 100.

FIG. 2 are diagrams showing an example of the outer appearance of the mobile phone 100. FIG. 2(A) is a perspective view from a front surface direction, and FIG. 2(B) is a perspective view from a back surface direction.

The mobile phone 100, as shown in FIG. 2, has a first housing (upper housing) 501 and a second housing (lower housing) 502. These two housings 501 and 502 can be opened/closed relative to each other by being connected via a hinge portion 503 so that they can be freely folded up.

On a surface 501A of the first housing 501 facing the second housing 502 in the folded up state (closed state), a display part 518 (107 of FIG. 3) and a speaker 504 (105 of FIG. 3) are arranged. On a surface 502A of the second housing 502 facing the first housing 501 in the closed state, a key input part 517 (103 of FIG. 3) and a microphone 505 (106 of FIG. 3) are arranged.

In the second housing 502, a non-contact communication function part 506 (111 of FIG. 3) is built in. The non-contact communication function part 506 has an IC chip 510 in which a communication circuit etc. are formed and has an antenna 520 (112 of FIG. 4) formed by interconnects of a circuit board.

In the hinge portion 503 of the second housing 502, an antenna 507 (AT1 of FIG. 3) for performing wireless communication with the base station 300 and which can be freely extended and contracted is arranged.

Figure 3:
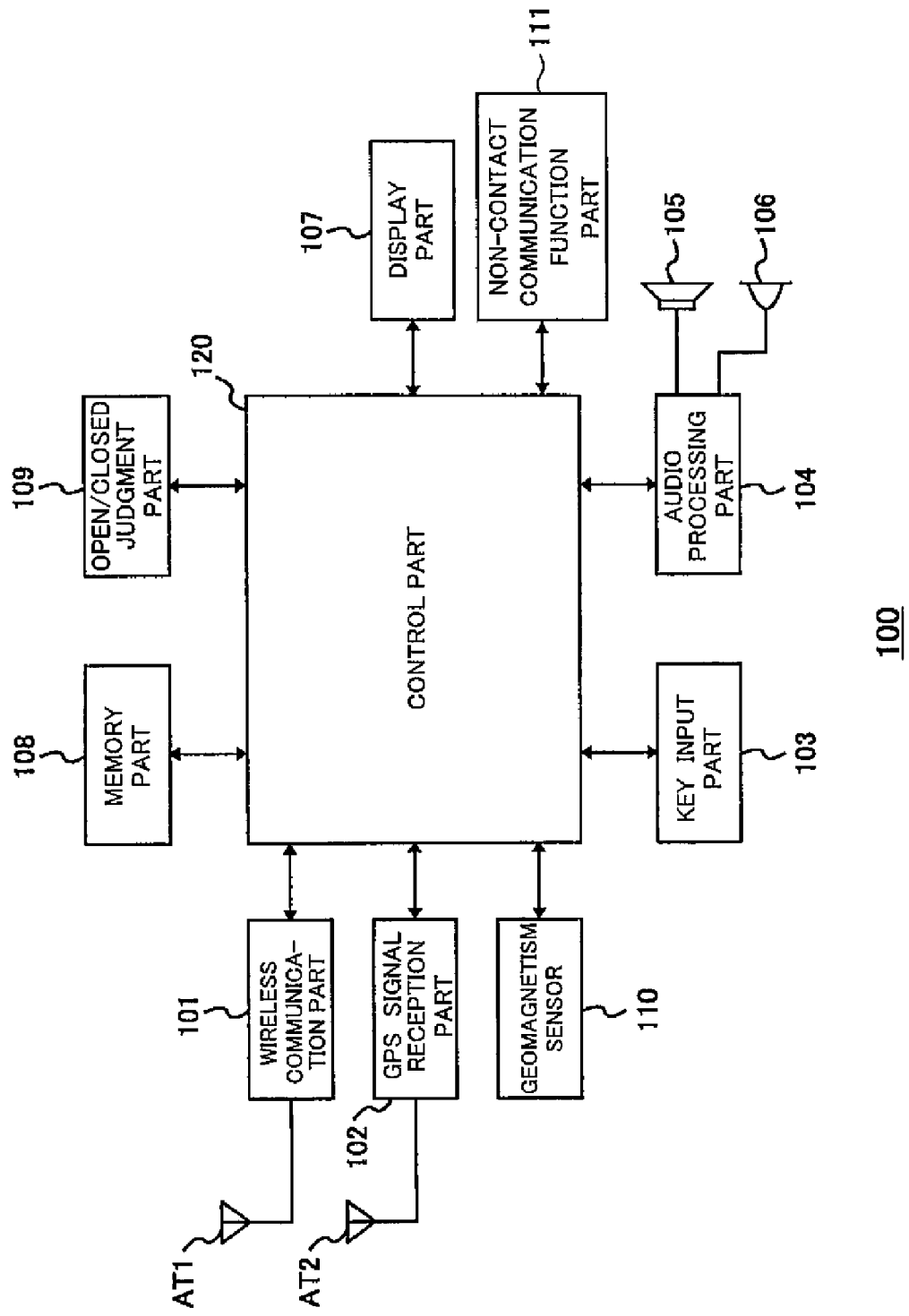
FIG. 3 A block diagram showing an example of the configuration of a mobile phone according to the embodiment of the present invention.

FIG. 3 is a block diagram showing an example of the configuration of the mobile phone 100 according to the embodiment of the present invention.

The mobile phone 100 shown in FIG. 3 has a wireless communication part 101, GPS signal reception part 102, key input part 103, audio processing part 104, speaker 105, microphone 106, display part 107, memory part 108, open/closed judgment part 109, geomagnetism sensor 110, non-contact communication function part 111, and control part 120.

The wireless communication part 101 performs processing concerning wireless communication with the base station 300. For example, it applies predetermined modulation processing to transmission data output from the control part 120 to convert it to a wireless signal which it transmits from the antenna AT1. Further, it applies predetermined demodulation processing to the wireless signal received at the antenna AT1 to reproduce the reception data and outputs the same to the control part 120.

The GPS signal reception part 102 receives the GPS signals transmitted from the GPS satellites 200 and applies amplification, noise elimination, modulation, or other signal processing to acquire information required for calculating the geographical position of the mobile phone 100 at the GPS server 401.

The key input part 103 has keys to which various functions are assigned, for example, a power key, a talk key, number keys, letter keys, direction keys, and an execute key. When such a key is operated by the user, a signal corresponding to that operation content is generated. This is input as an instruction of the user to the control part 120.

The audio processing part 104 processes the audio signal output at the speaker 105 and audio signal input at the microphone 106. Namely, it applies amplification, analog-to-digital conversion, encryption, or other signal processing to the audio signal input from the microphone 106, converts this to digital audio data, and outputs the same to the control part 120. Further, it applies decryption, digital-to-analog conversion, amplification, or other signal processing to the audio data supplied from the control part 102, converts the same to an analog audio signal, and outputs this to the speaker 105.

The display part 107 is configured by using a display device, for example, a liquid crystal display panel or an organic EL panel, and displays an image in accordance with a video signal supplied from the control part 120. For example, a phone number of a destination at the time of making a call, a phone number of the other party in reception at the time of reception, the content, date, and time of the reception mail or transmission mail, remaining battery life, waiting screen, and other various types of information and images are displayed. Further, as will be explained later, when performing the navigation, a map of the periphery of the present location is displayed.

The memory part 108 stores various types of data utilized for the processing in the control part 120. For example, a program of a computer provided in the control part 120, an address book managing phone numbers, e-mail addresses, and other personal information, an audio file for playing back a reception sound and an alarm sound, various types of setting data, temporary data utilized in the processing step of the program, and so on are retained.

The memory part 108 is configured by, for example, a non-volatile memory device (non-volatile semiconductor memory, hard disc device, optical disc device, etc.), or a random accessible memory device (for example, SRAM or DRAM).

The open/closed judgment part 109 judges the open/closed state of the first housing 501 and second housing 502 connected via the hinge portion 503. For example, the open/closed judgment part 109 includes a switch or other detector detecting the closed state when a superimposed state of the first housing 501 and the second housing 502 is exhibited and distinguishes between the closed state and the state other than this.

The geomagnetism sensor 110 detects the geomagnetism used for the calculation of the bearing.

The geomagnetism sensor 110 is, for example, arranged on a circuit board of the inside of the second housing 502, uses a predetermined coordinate system (biaxial or triaxial) set on the circuit board as a standard, and detects the geomagnetism in each of those axial directions. For the detection of the geomagnetism, use is made of various methods, for example, a method of detecting a resistance value of a magnetoresistance device, a method of utilizing excitation of a coil, and a method of utilizing the Hall effect.

The geomagnetism sensor 110 is configured by, for example, a device part (magnetoresistance device etc.) fluctuating in state due to magnetism and a driver part periodically detecting the fluctuation value of this device part. The control part 120 drives the driver part based on a program of an electronic compass included in the navigation program etc. stored in the memory part 108 and makes it perform periodic detection and further periodically detects this detection result. Then, by correcting an offset error explained later from the detection values of the device part and driver part, the correct bearing is calculated. In the present embodiment, the processing concerning this calculation of the offset error and the correction is sometimes called "calibration" of the geomagnetism sensor 110.

The non-contact communication function part 111 performs non-contact communication by electromagnetic coupling with an external reader/writer device 600. For example, when receiving an AM modulation signal issued as an electromagnetic wave from the external reader/writer device 600, the non-contact communication function part 111 transfers information with the external reader/writer device 600 by returning a response to the reader/writer device 600 by load modulation or another method.

Figure 4:
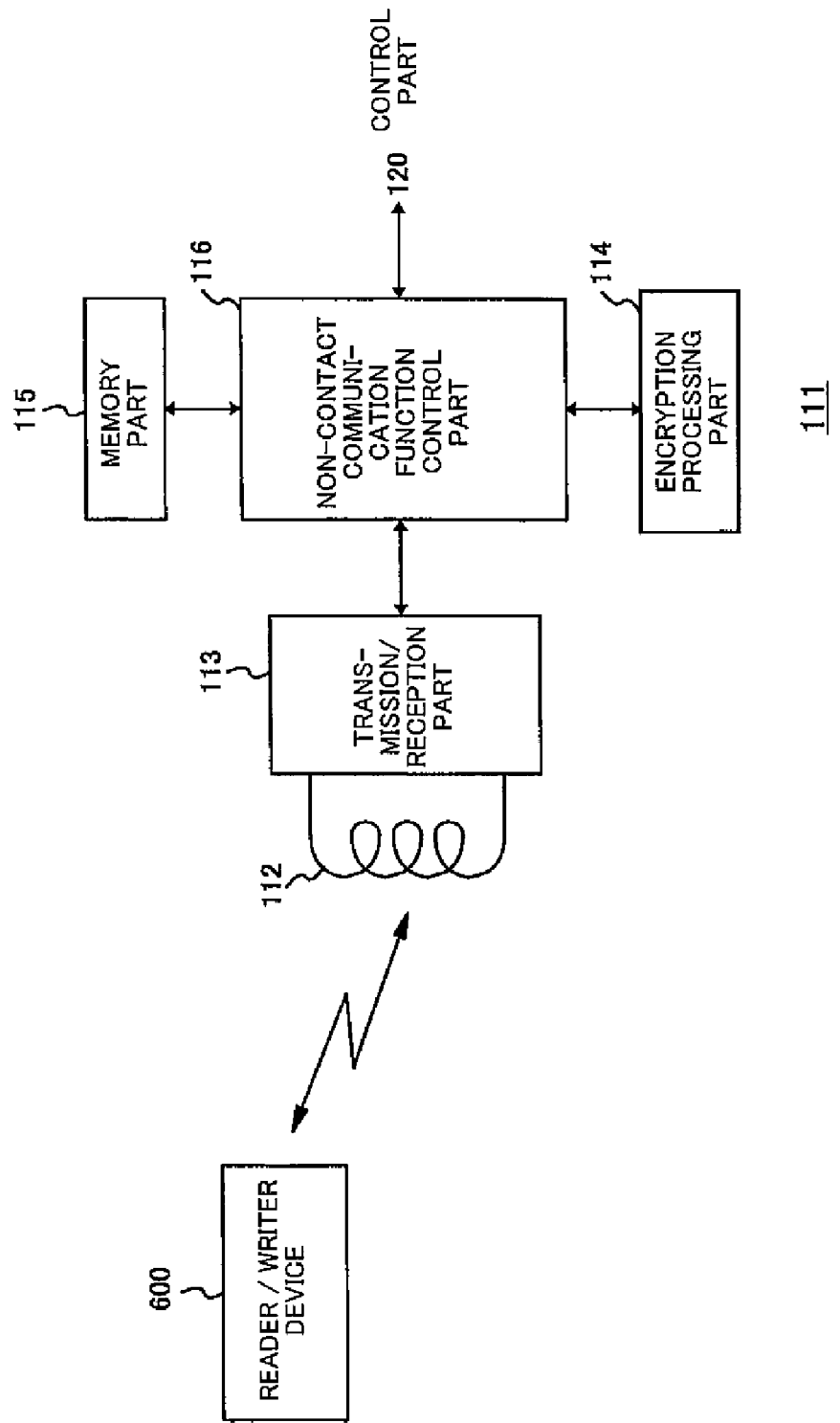
FIG. 4 A diagram showing an example of the configuration of a non-contact communication part.

FIG. 4 is a diagram showing an example of the configuration of the non-contact communication function part 111.

The non-contact communication function part 111 shown in FIG. 4 has an antenna 112, transmission/reception part 113, encryption processing part 114, memory part 115, and IC card control part 116.

The transmission/reception part 113 demodulates a baseband signal from a signal received at the antenna 112 and reproduces a clock signal based on a carrier component of the reception signal and decrypts the baseband signal in synchronization with the clock signals to acquire reception data. Further, it encrypts the transmission data supplied from the IC card control part 116 to generate a transmission signal and drives the antenna 112 in accordance with the transmission signal to thereby transmit the information to the reader/writer device 600.

Note that, the antenna 112 functions as a coil and is excited and electromagnetically coupled when receiving an electromagnetic wave from the reader/writer device 600. A signal generated by fluctuation of intensity etc. of the electromagnetic wave from the reader/writer device 600 is received at the antenna 112. The transmission/reception part 113 and the non-contact communication function part 116 extract the reception signal from the fluctuation of induced electromotive force on the antenna 112 side.

The transmission/reception part 113 and the encryption processing part 114, memory part 115, and non-contact communication function control part 116 may be driven by power on the mobile phone 100 side or may be driven by induced electromotive force from the antenna 112.

The encryption processing part 114 performs processing concerning encryption and decryption of the information transferred with the reader/writer device 600.

The memory part 115 stores an encryption key and various types of secret information required for starting the communication with the reader/writer device 600.

Further, the memory part 115 stores electronic money information etc. Specifically, this is monetary information. Money is charged by communication with the reader/writer device 600 or communication when connected with an electronic money management server (not shown) by using the wireless communication part 101.

The IC card control part 116 performs communication with the reader/writer device 600 based on a predetermined communication protocol and performs the processing for transferring information. For example, the reader/writer device 600 is connected with a not shown verification apparatus and transmits a random number encrypted by the predetermined encryption key in this verification apparatus to the non-contact communication function part 111. The IC card control part 116 decrypts the encrypted random number by the encryption processing part 114 by using the encryption key of the memory part 115 and returns the result to the reader/writer device 600. The verification apparatus judges whether or not the non-contact communication function part 111 holds a legitimately registered encryption key by comparing the random number returned to the reader/writer device 600 with the original random number.

Further, when purchasing a commodity or the like, the apparatus communicates with the reader/writer device 600, and the non-contact communication function control part 116 performs processing subtracting a sum of money corresponding to the purchased commodity from a stored balance of the memory part 115.

The control part 120 centrally controls the overall operation of the mobile phone 100. Namely, it controls the operations of the units explained above (transmission/reception of signals at the wireless communication part 101, reception operation of GPS signals at the GPS signal reception part 102, input/output of audio at the audio processing part 104, display of images on the display part 107, etc.) so that various processing (audio speech performed via a line switching network, preparation and transmission/reception of e-mails, inspection of web site of Internet, navigation processing, etc.) of the mobile phone 100 is executed in a suitable order in response to the operation of the key input part 103.

For example, the control part 120 is provided with a computer executing processing based on a program (operating system, application, etc.) stored in the memory part 108 and executes the processing explained above according to the order instructed in this program.

The control part 120 performs, as the processing related to the navigation function, processing calculating the bearing based on the detection value of the geomagnetism sensor 110, processing transmitting information of GPS signals received at the GPS signal reception part 102 to the GPS server 401 and acquiring the position information of the present location, processing transmitting this position information to the navigation server 402 and acquiring the information of a map of the periphery of the present location, processing calculating the present location based on a positioning use signal from the base station 300 and the calculation result of the bearing, processing controlling an orientation of the map on the screen of the display part 107 (heading up display processing) in accordance with the calculation result of the bearing, and so on. The control part 120 executes these processing according to an application program for navigation (hereinafter described as a "navigation application") stored in the memory part 108.

Further, when the non-contact communication function part 111 performs non-contact communication, the control part 120 executes the processing concerning the calibration of the geomagnetism sensor 110 after the end of that communication. As the processing concerning the calibration, for example, a message prompting the calibration of the geomagnetism sensor 110 is displayed on the display part 107 or the geomagnetism sensor 110 is automatically calibrated.

Inside the portable electronic apparatus 100, electronics parts and metal parts, for example, a shield case, a memory card holder, and a reinforcing metal sheet are included. These are magnetized to become magnetic when subjected to a strong magnetic field and have polarity and generate a magnetic field. The magnetic field generated by the reader/writer device 600 is not an exception to this either and causes magnetization in the portable electronic apparatus 100.

On the other hand, the inside of the mobile phone 100 is cramped. In the geomagnetism sensor 110, parts which are easily magnetized as described above are laid out in close proximity. For this reason, the geomagnetism sensor 110 senses, other than the magnetic field due to pure geomagnetism, the magnetic fields generated by the magnetized parts inside the mobile phone 100. The calibration of the geomagnetism sensor 100 calculates and corrects fixed offset error of the detection value occurring based on the magnetic fields inside the mobile phone 100.

When rotating the mobile phone 100 with respect to the horizontal plane, the magnetic field of the geomagnetism applied to the geomagnetism sensor 110 changes along with the rotation operation, but the magnetic fields generated by the parts inside the mobile phone 100 fixed in positional relationships with respect to the geomagnetism sensor 100 do not change by the rotation operation. Therefore, for example, while the user is made to execute the operation of rotating the housings of the mobile phone 100 horizontally with respect to the horizontal plane (that is, the operation of changing the 2 axes' worth of the parameters of the geomagnetism sensor 100), the control part 120 acquires a plurality of detection values of the geomagnetism sensor 100 and calculates the fixed offset value based on these plurality of detection values.

Note that when the geomagnetism sensor 110 can detect the geomagnetism along three axes or more, by sequentially acquiring samples by changing the detection method for each axis, it is possible to calculate the offset error without rotating the housings (that is, automatic calibration).

The control part 120 may perform processing concerning the calibration explained above every time after the non-contact communication ends. Note that when the detection value of the geomagnetism sensor is not utilized for a purpose other than the calculation of the bearing, it is pointless to perform the calibration at each non-contact communication. Therefore, in that case, the processing concerning the calibration may be executed when starting the calculation of the bearing after the non-contact communication ends.

For example, the control part 120 executes the processing concerning the calibration of the geomagnetism sensor 110 when calculating the bearing in the navigation application after the non-contact communication ends, for example, in a case where the navigation application is activated after the end of the non-contact communication or a case where the non-contact communication ends during the operation of the navigation application.

The control part 120 judges whether or not the non-contact communication ends based on a status signal output from the non-contact communication function part 111. For example, when assuming that a status signal indicating a start point of time and an end point of time of the non-contact communication is output from the non-contact communication function part 111, the control part 120 judges the end of the non-contact communication in response to the status signal indicating the end point of time. Further, when assuming that the status signal is output from the non-contact communication function part 111 (the non-contact communication function control part 116) only during non-contact communication, the control part 120 judges that the state of current non-contact communication ends based on a generation of a shift to the state where the status signal is not received after the state where that status signal was received occurred.

Further, the control part 120 may judge whether or not the non-contact communication ends based on a change of the detection value of the geomagnetism sensor 110. For example, when a time average of detection values of the geomagnetism sensor 110 exceeds a predetermined threshold value, it may be judged the apparatus has entered into the magnetic field of the reader/writer device 600 (that is, non-contact communication is started), while when returning to the original state from this threshold value exceeded state, it may be judged that the non-contact communication has ended.

Further, when judging that the non-contact communication ends, after a predetermined time passes from that judgment, the control part 120 may execute processing concerning the calibration of the geomagnetism sensor 110 (the display prompting calibration, automatic calibration, etc.) Due to this, calibration in a state immediately after the non-contact communication where the peripheral magnetic field is unstable and the magnetic field of the inside of the mobile phone are unstable is prevented.

Further, the control part 120 may execute the processing concerning the calibration of the geomagnetism sensor 110 only in a case where it is judged at the open/closed judgment part 109 that the first housing 501 and the second housing 502 are in the unfolded, open state, that is, a case where the screen of the display part 104 displaying the information of the bearing is exposed.

The calibration result of the geomagnetism sensor 110 changes in accordance with the angle of the housings with respect to the horizontal plane. The control part 120 performs the calibration processing so that the bearing can be calculated with the best precision in a state where the information of the bearing is displayed to the user (that is, housings become substantially horizontal with respect to the horizontal plane). Accordingly, by executing processing concerning the calibration in the state where display of the information of the bearing is possible, the calculation precision of the bearing is improved.

Further, in general, the closed state can also be said to be a state where the user does not intend to view the display part 104. Accordingly, in this closed state, the possibility that the housings do not become horizontal is high, and it is anticipated that the precision of the calibration in this state will become low.

Here, an explanation will be given of the operation of a mobile phone 100 having the configuration explained above focusing on the navigation function according to the present invention.

First, the reception processing of the GPS signal will be explained.

Figure 5:
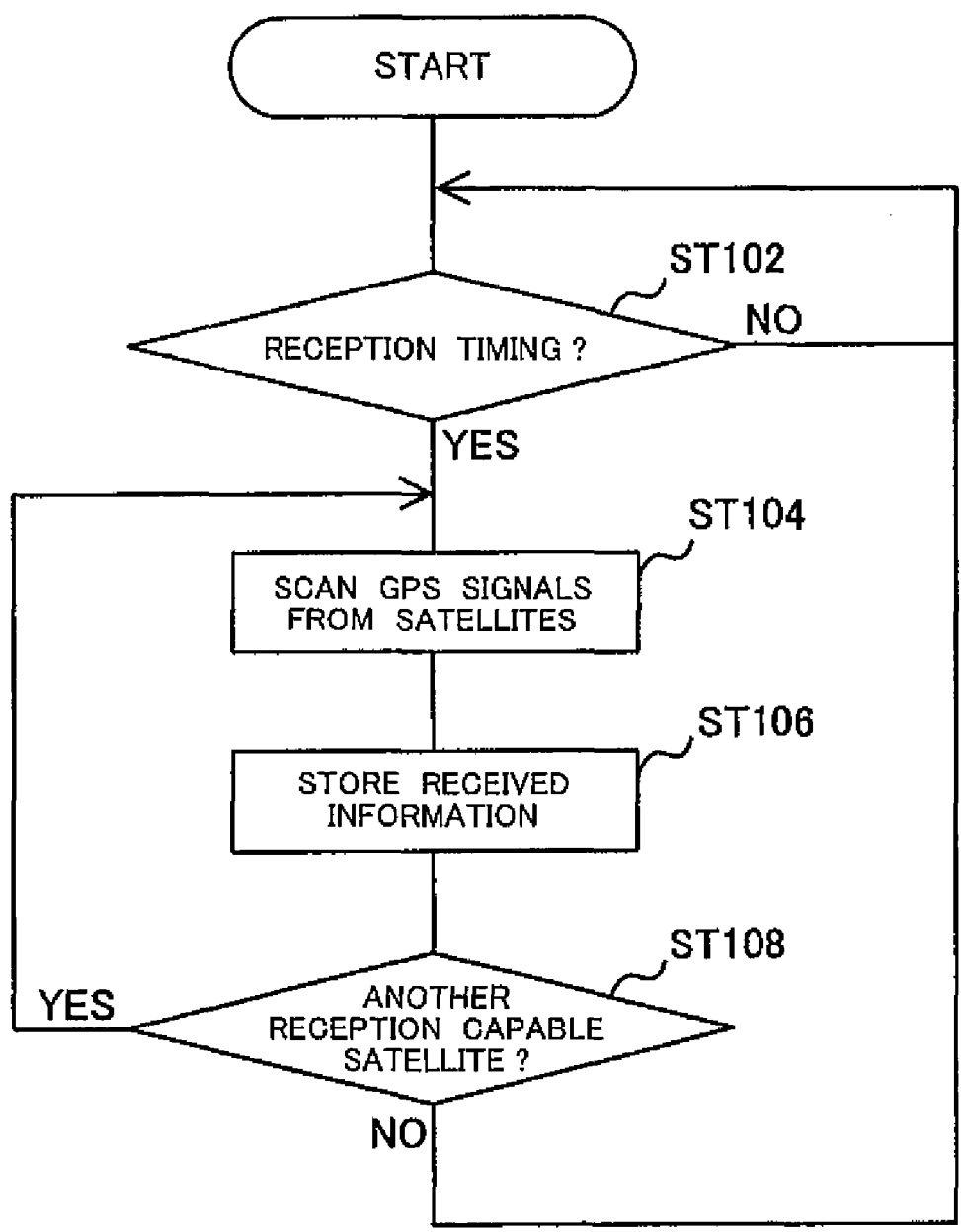
FIG. 5 A flow chart showing an example of a GPS signal reception processing in a mobile phone.

FIG. 5 is a flow chart showing an example of the GPS signal reception processing in the mobile phone 100.

The control part 120 controls the GPS signal reception part 102 at a constant timing, for example, intervals of 2 seconds and scans for GPS signals from satellites (steps ST102 and ST104). When the GPS signal can be received as a result of scanning, that information is stored in the memory part 108 (ST106). Such scanning of the GPS signal and storage of information are repeated for all of the satellites able to be received from (steps ST108, ST104, ST106). When all satellites have been scanned, the processing of steps ST104 to 108 is carried out again after waiting for the next GPS signal reception timing. The control part 160 always executes such GPS signal reception processing in a period where, for example, the power is ON.

Next, the navigation processing will be explained.

Figure 6:
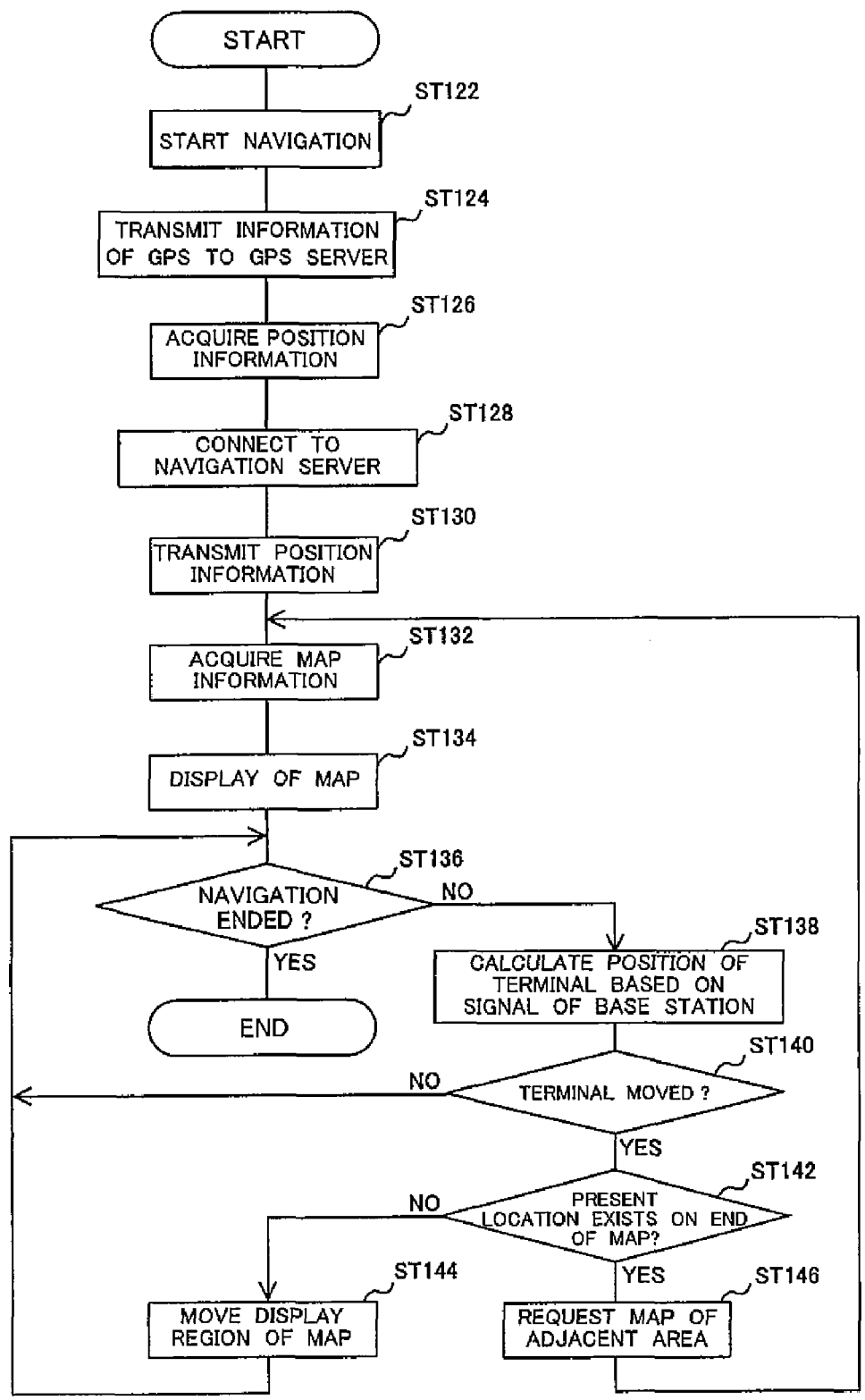
FIG. 6 A flow chart showing an example of navigation processing.

FIG. 6 is a flow chart showing an example of the navigation processing.

In the control part 120, for example, when the start of the navigation processing is selected by a key input operation etc. at the key input part 103 (step ST122), the control part 120 activates the navigation application. First, the control part 120 performs processing transmitting the information obtained by the GPS reception processing explained above from the wireless communication part 101 via the base station 300 and communication network to the GPS server 401 (step ST124).

When receiving the information of GPS from the mobile phone 100, the GPS server 401 calculates the position of the present location (for example, information of latitude and longitude) of the mobile phone 100 based on this received GPS information and transmits the calculation result through the communication network and the base station 300 to the mobile phone 100.

The mobile phone 100 receives the position information transmitted from the GPS server 401 and stores it in the memory part 108 (step ST126).

Next, the control part 120 accesses the navigation server 402 from the wireless communication part 101 via the base station 300 and communication network (step ST128) and transmits the acquired position information to the navigation server 402 (step ST130).

After receiving the position information from the mobile phone 100, the navigation server 402 retrieves from the database the information of a map of the periphery of the present location of the mobile phone 100 specified by this position information and transmits the retrieved map information through the communication network and the base station 300 to the mobile phone 100.

The mobile phone 100 receives the map information transmitted from the navigation server 402 and stores it in the memory part 109 (step ST132).

Figure 7:
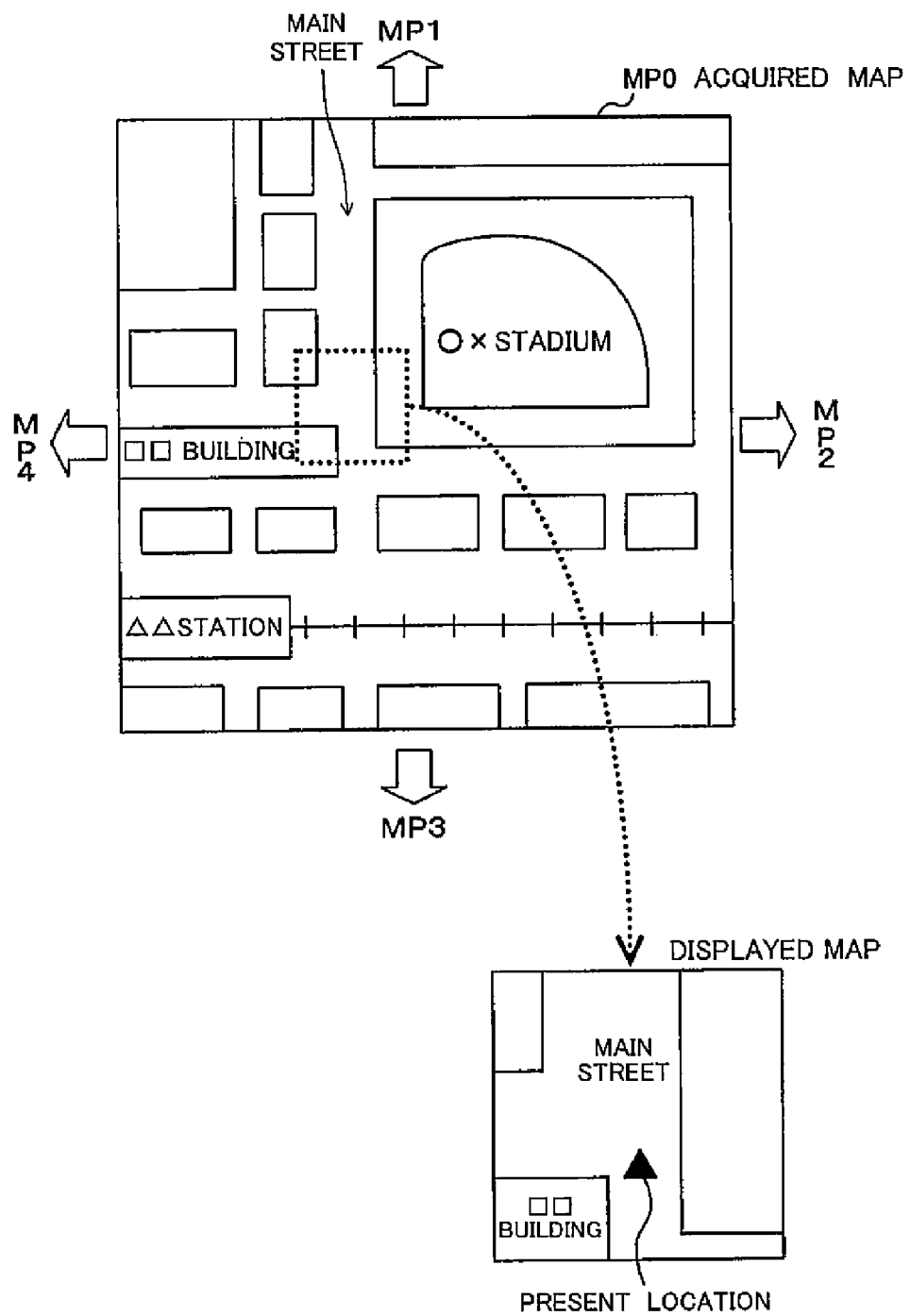
FIG. 7 A diagram showing an example of map information transmitted from a navigation server.

FIG. 7 is a diagram showing an example of the map information transmitted from the navigation server 402.

In the present embodiment, as an example, it is assumed that an identification number inherent in the map information is assigned to each. The navigation server 402, based on this identification number, manages the data of the map for each predetermined size (for example, 1 km square), attaches this identification number to the data of the map, and transmits where the map information is transmitted to the mobile phone 100. In the example of FIG. 7, the map of the periphery of the present location has the identification number MP0. The maps on the four sides thereof have identification numbers MP1 to MP4.

After such map information is acquired, the control part 160 generates image data of the map of the periphery of the present location based on the acquired map information and makes the display panel of the display part 107 display the map (step ST134).

A region of the map displayed on the display panel is, for example, as shown in FIG. 7, a region (for example, 200 m×300 m) acquired from the navigation server 402 and narrower than the map of 1 km square.

As the display method of the map, for example, it is possible to select either of a north up display (the display directing the north on the map to the top of the screen) or the heading up display (the display directing the advancing direction on the map to the top of the screen).

When the north up display is selected by a key operation of the key input part 103, the control part 120 makes the display part 107 fix the north direction of the map to the upward direction of the display screen for display. In this case, as the orientation of the mobile phone 100, the control part 120 makes the display part 107 display the result of the processing based on the detection value from the geomagnetism sensor 110 together with the map by an icon etc. expressing a compass shape.

On the other hand, when heading up display is selected by a key operation of the key input part 103, the control part 120 controls the orientation of the map on the display screen in accordance with the bearing calculated based on the detection value of the geomagnetism sensor 110. For example, the orientation of the map is controlled so that the bearing of the advancing direction is directed upward on the display screen.

When the display of the map is started as explained above, the control part 120 repeats the processing of step ST138 and the following steps explained next during the period up to when an end of the navigation processing is selected by the key operation of the key input part 103 (step ST136).

First, the control part 120 makes the wireless communication part 101 receive the positioning use reference signals transmitted from a plurality of (for example, three or more) base stations 300 at the periphery of the mobile phone 100 and calculates the position of the present location based on those received signals (step ST138). Then, any movement of the mobile phone 100 is judged from the result of calculation of the present location (step ST140). When it is judged that the mobile phone 100 does not move, the present location is continuously calculated based on the reference signals from the base stations 300 (ST138).

At step ST140, if it is judged that the mobile phone 100 moved, the control part 120 judges whether or not the location of the destination is in the region on the end of the map which is acquired at present (step ST142). For example, in cases where a part of the map to be displayed on the display part 107 is not included in the map which is acquired at present, but included in the map adjacent to this, it is judged that the present location is in the region on the end of the map.

When it is judged that the present location is in the end region, the control part 120 requests the map adjacent to this end region to the navigation server 146 (step ST146). For example, the identification number of the map being acquired present and information for instructing to which bearing among east, west, north, and south is it adjacent with respect to this map are transmitted to the navigation server 146.

The navigation server 402 detects the map in accordance with the information sent from the mobile phone 100 from the database and transmits the same to the mobile phone 100.

The mobile phone 100 receives the map information transmitted from the navigation server 402 and stores it in the memory part 109 (step ST132). Further, it makes the display part 107 display the map in accordance with this map information (step ST134). After that, the processing of step ST138 and on is repeated.

Further, when it is judged that the present location does not exist in the end region, the control part 120 performs, for example, processing for moving the display region of the map so that the present location of the mobile phone 100 becomes the center of the map in accordance with the result of calculation of the present location and repeats the processing of step S138 and on after that.

Next, an explanation will be given of the calculation and display of the bearing in the navigation application.

Figure 8:
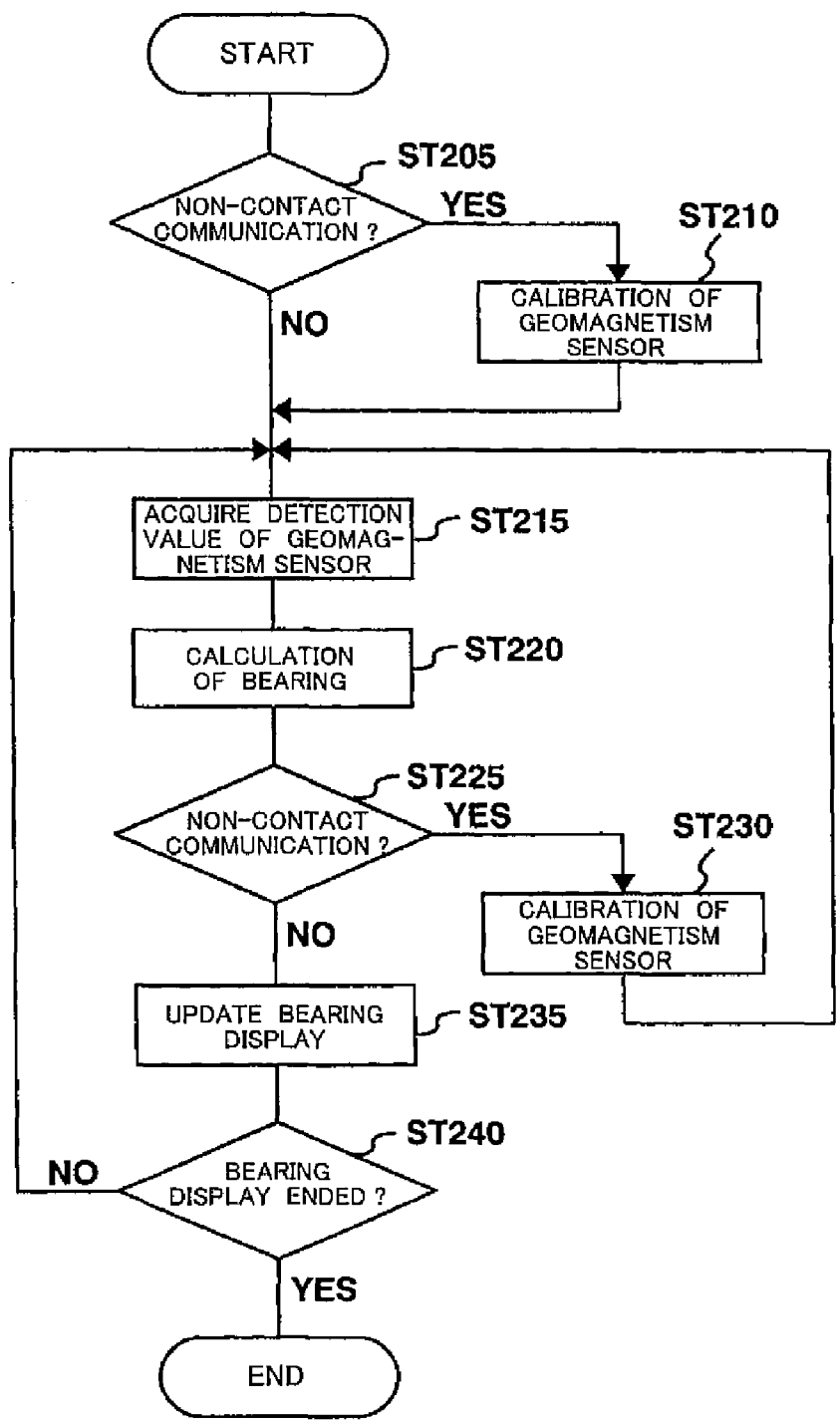
FIG. 8 A flow chart showing a first example of processing concerned with calculation and display of a bearing.

FIG. 8 is a flow chart showing a first example of the processing concerning the calculation and display of the bearing.

When the navigation application is activated, first, the control part 120 judges whether or not communication was carried out at the non-contact communication function part 111 (step ST205).

Figure 9:
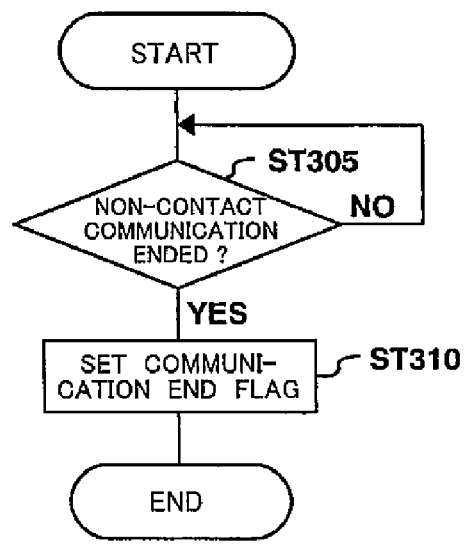
FIG. 9 A flow chart showing a first example of processing for monitoring non-contact communication.

For example, the control part 120, as shown in the flow chart of FIG. 9, constantly monitors whether or not the non-contact communication was carried out in the state where the power is ON (step ST305). if non-contact communication is carried out, it sets a communication end flag fg1 stored in the memory part 108 at (step ST310). The control part 120 checks the value of this communication end flag fg1 so as to judge whether or not the non-contact communication function part 111 carried out communication.

In cases of judging that the non-contact communication function part 111 carried out communication, the control part 120 executes processing concerning the calibration of the geomagnetism sensor 110 (step ST210).

Figure 10:
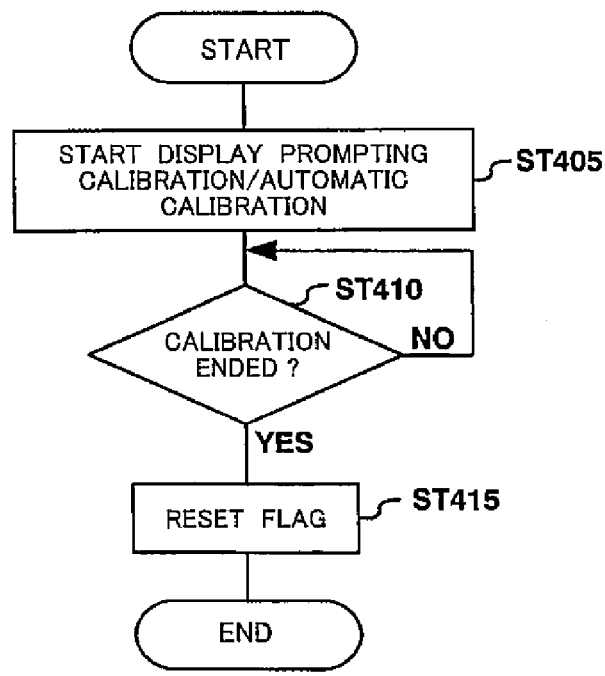
FIG. 10 A flow chart showing a first example of processing concerned with calibration of a geomagnetism sensor.

For example, the control part 120, as shown in the flow chart of FIG. 10, displays a message or image prompting the calibration on the display part 107 to make the user perform the operation of rotating the housings of the mobile phone 100 or the like and thereby execute the calibration. In a case that the geomagnetism sensor 110 is a triaxial type, automatic calibration not needing the rotation of housings may be executed as well (step ST405). The control part 120 stores the data of the offset value obtained by the calibration in the memory part 108.

After the end of the calibration, the control part 120 resets the communication end flag fg1 explained above to "0" (steps ST410 and ST415).

Next, the control part 120 acquires the detection value of the geomagnetism sensor 110 (step ST215) and calculates the bearing based on this acquired detection value and the offset value stored in the memory part 109 (step ST220).

After calculating the bearing, the control part 120 judges whether or not the non-contact communication was carried out based on the value of the communication end flag fg1 explained above. If judging that the non-contact communication was carried out, it executes, for example, the processing concerning the calibration as shown in the flow chart of FIG. 10 (step ST230). After executing the processing concerning the calibration, it returns to step ST215 again and acquires the detection value of the geomagnetism sensor 110 and calculates the bearing (steps ST215 and ST220).

If judging that the non-contact communication has not been carried out, the control part 120 updates the display of the bearing on the display part 107 (step ST235). For example, it updates the image showing the bearing at present (rotates the picture of the compass etc.) and, where the heading up display is carried out, updates the orientation of the map.

Until the end of the navigation application is selected (step ST240), steps ST215 to ST235 explained above are repeated.

AS explained above, according to the present embodiment, if non-contact communication is carried out at the non-contact communication function part 111, the processing concerning the calibration of the geomagnetism sensor 110 is executed after the end of that communication, therefore a drop of the detection precision of geomagnetism accompanying non-contact communication can be suppressed.

Further, by executing the calibration processing when the calculation of the bearing is started after the non-contact communication ends (in the case where the navigation application is activated after the end of the non-contact communication, the case where the non-contact communication ends during the activation of the navigation application etc.), the power consumption can be reduced in comparison with the case where the calibration is carried out every time after the end of the non-contact communication.

Specifically, for example, a case where the non-contact communication function part corresponds to a charging system for entering/exiting an automatic ticket gate of a train and the train is utilized during the navigation can be envisioned. A navigation service for pedestrians includes also instructions for changing trains etc. Inevitably, passing through the automatic ticket gate of trains is considered. Namely, it is envisioned that non-contact communication with the automatic ticket gate (one example of the reader/writer device 600) will be carried out during the navigation or the navigation will be activated immediately after the non-contact communication at the automatic ticket gate. Even in such a case, according to the present embodiment, identification of the bearing calibrated with a precision as high as possible, but without waste becomes possible, and the user can be guided to the target location more reliably.

Next, an explanation will be given of a second example of the processing concerning the calculation and display of the bearing with reference to the flow chart of FIG. 11.

Figure 11:
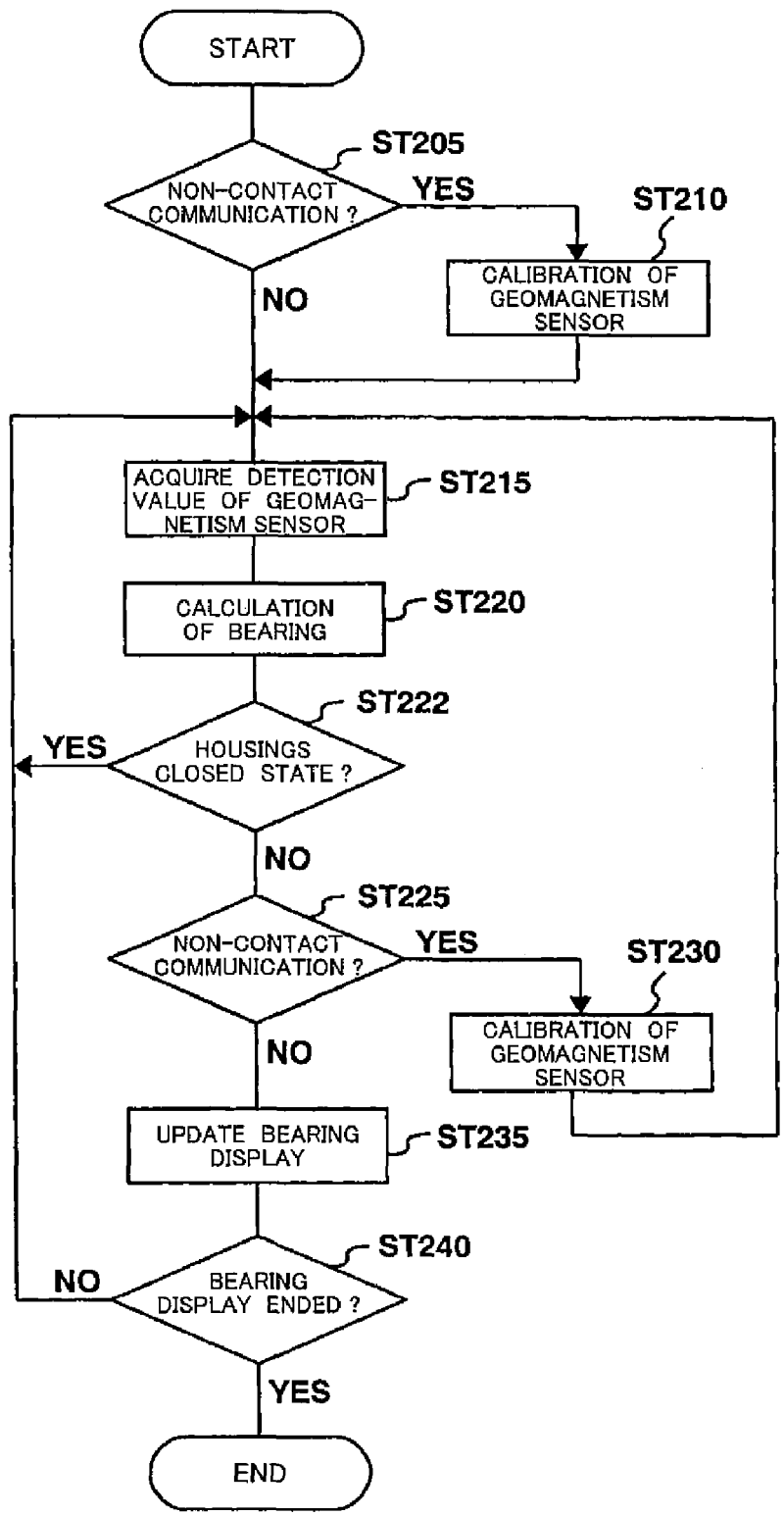
FIG. 11 A flow chart showing a second example of processing concerned with calculation and display of a bearing.

The flow chart shown in FIG. 11 is obtained by providing step ST222 in the flow chart shown in FIG. 8.

The control part 120, before performing the judgment processing of step ST225, judges whether or not the housings are in the closed state based on the judgment result of the open/closed judgment part 109. In a case of judging the closed state, the control part 120 does not perform the judgment processing of step ST225, calibration processing of step ST230, and display update processing of step ST235, but returns to step ST215.

Due to this, when non-contact communication is carried out in the state where the bearing cannot be displayed, reduction of the power consumption can be achieved without useless calibration. Further, there is a good possibility that the correct calibration cannot be performed in the closed state where the bearing cannot be displayed. Therefore, by preventing the calibration from being performed in such a state, a drop of the calculation precision of the bearing can be prevented.

Next, an example of the processing in a case where a constant waiting time is provided from when the non-contact communication ends to when the calibration processing is executed will be explained with reference to FIG. 12 and FIG. 13.

Figure 12:
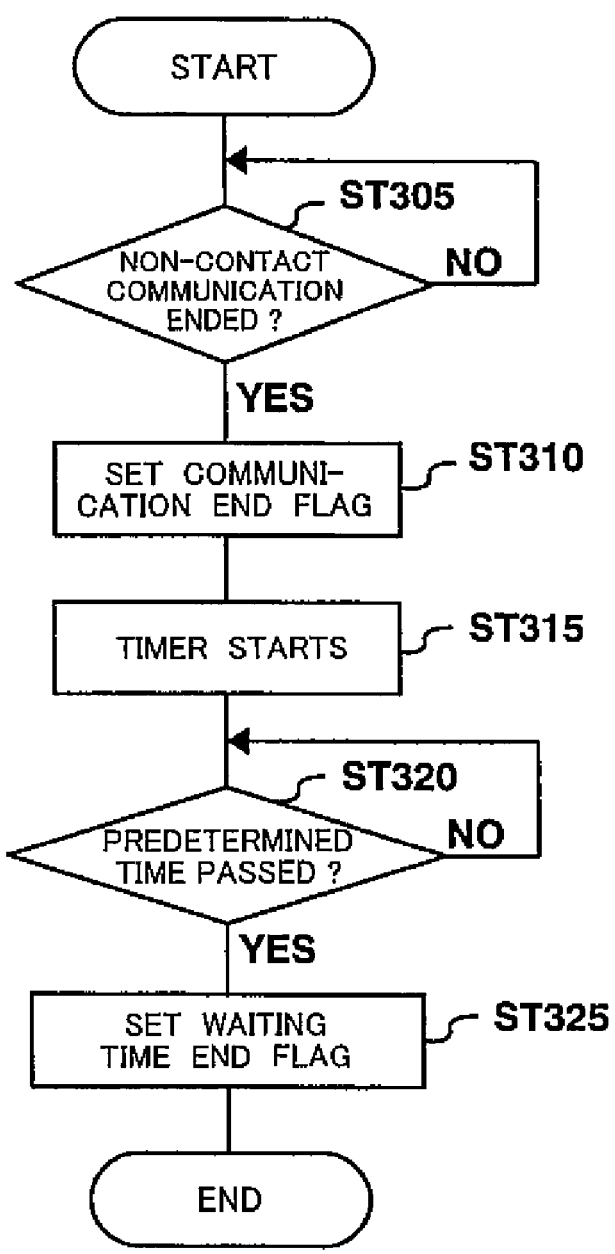
FIG. 12 A flow chart showing a second example of processing for monitoring non-contact communication.

In this case, the control part 120, as shown in the flow chart of FIG. 12, sets a waiting time end flag fg2 by newly adding steps ST315, ST320, and ST325 in the monitor processing of the non-contact communication shown in FIG. 9. Namely, in a case of detecting the end of the non-contact communication (step ST305), the control part 120 sets the communication end flag fg1 at "1" (step ST310) and starts a timer counting a predetermined time (step ST315). When the timer counts the predetermined time (step ST320), the control part 120 sets the waiting time end flag fg2 at "1" (step ST325).

Figure 13:
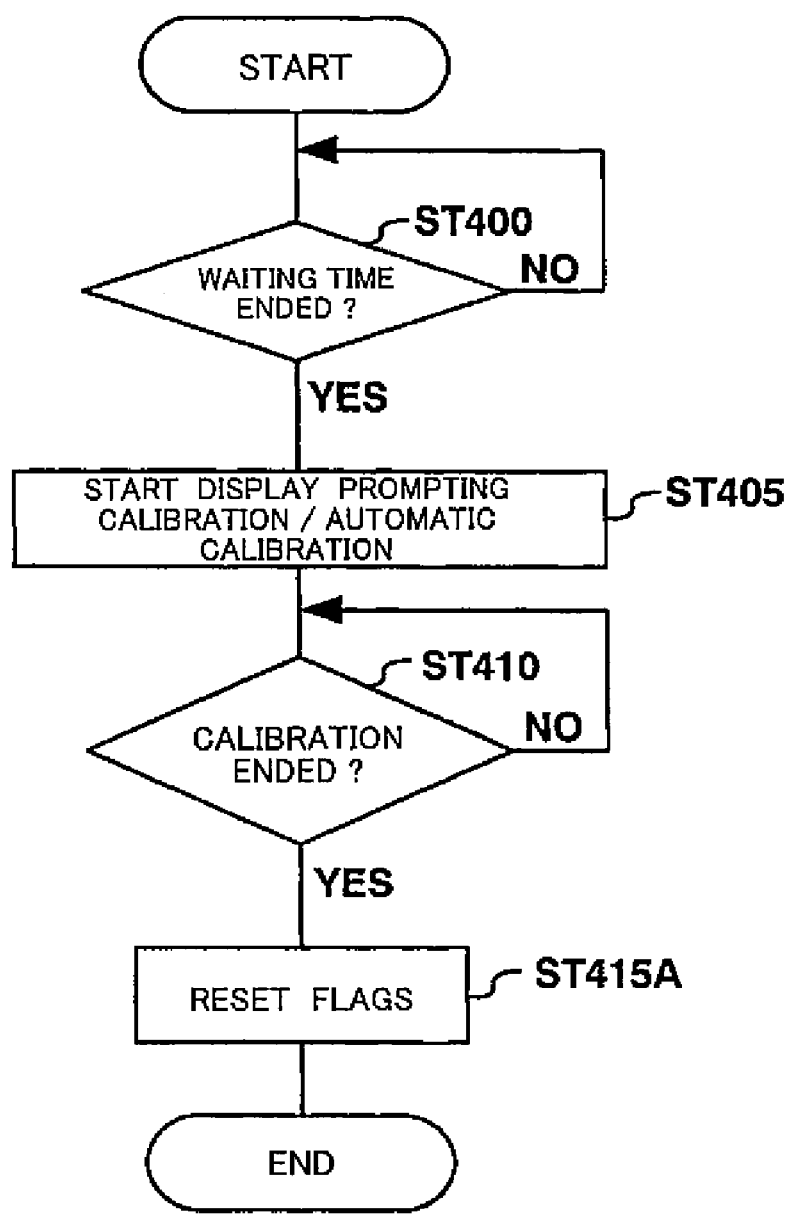
FIG. 13 A flow chart showing a second example of processing concerned with the calibration of a geomagnetism sensor.

On the other hand, the control part 120, as shown in the flow chart of FIG. 13, adds a new step ST400 to the calibration processing shown in FIG. 10 to provide a waiting time until the calibration is executed. Namely, the control part 120 suspends the shift to the calibration processing of step ST405 until the waiting time end flag fg2 explained above becomes "1". When the predetermined time passes from the end of the non-contact communication and the communication end flag fg1 becomes "1", the control part 120 executes the calibration processing from step ST405. When the calibration ends (step ST410), the control part 120 resets both of the communication end flag fg1 and waiting time end flag fg2 to "0".

In this way, by providing a constant waiting time from the end of the non-contact communication to the execution of the calibration, execution of the calibration in the unstable state immediately after the non-contact communication can be prevented.

Examples of embodiments of the present invention were explained above, but the present invention is not limited to only the above embodiments.

For example, the processing of the control part 120 may be executed by software by a computer as explained above or at least a part thereof may be executed by hardware.

The portable electronic apparatus of the present invention is not limited to a mobile phone and can be applied to various portable electronic apparatuses which can mount geomagnetism sensors, for example, portable game machines, PDAs (personal digital assistants), and notebook type computers.

The invention claimed is:

1. A portable electronic apparatus comprising:
   a display part configured to display information,
   a geomagnetism sensor detecting geomagnetism, a control part configured to compute by a processor a bearing based on a detection value of the geomagnetism sensor and to display information concerning the bearing on the display part, and
   a non-contact communication part configured to engage in non-contact communication by electromagnetic coupling,
   wherein the control part can execute calibration-related processing concerning calibration of the geomagnetism sensor and, if non-contact communication is carried out in the non-contact communication part, executes the calibration-related processing after the end of the non-contact communication.

2. A portable electronic apparatus as set forth in claim 1, wherein the control part executes the calibration-related processing in a case where the non-contact communication is carried out while processing a program computing the bearing and displaying the same on the display part.

3. A portable electronic apparatus as set forth in claim 1, wherein
   the non-contact communication part reports a current state of non-contact communication or an end of non-contact communication to the control part, and
   the control part judges an end of non-contact communication based on a generation of a shift from a state where current non-contact communication is reported at the non-contact communication part to a state where it is not reported or based on a generation of reporting of the end of non-contact communication.

4. A portable electronic apparatus as set forth in claim 1, wherein the control part judges an end of non-contact communication based on a change of the detection value of the geomagnetism sensor.

5. A portable electronic apparatus as set forth in claim 1, wherein when executing the calibration-related processing due to ending of the non-contact communication, the control part executes the calibration-related processing after a predetermined time passes.

6. A portable electronic apparatus as set forth in claim 1, wherein when executing the calibration-related processing due to ending of the non-contact communication, the control part executes the calibration-related processing when computing the bearing and displaying it on the display part and does not execute the calibration-related processing when not displaying the bearing.

7. A portable electronic apparatus as set forth in claim 6, wherein when executing the calibration-related processing due to ending of the non-contact communication, the control part executes the calibration-related processing when starting a program computing the bearing and displaying the same on the display part after the non-contact communication.

8. A portable electronic apparatus as set forth in claim 6, wherein
   the apparatus comprises a memory part configured to store flag data, and
   the control part sets the flag data at a first value when the non-contact communication is carried out and executes the calibration-related processing and resets the flag data at a second value if the flag data is set at a first value in the memory part when computing the bearing and displaying the same on the display part.

9. A portable electronic apparatus as set forth in claim 1, wherein
   the apparatus is composed to be able to cover a screen of the display part, and
   in executing the calibration-related processing due to ending of the non-contact communication, the control part executes the calibration-related processing when the screen of the display part is exposed.

* * * * *